US006429653B1

(12) United States Patent
Kruspe et al.

(10) Patent No.: US 6,429,653 B1
(45) Date of Patent: Aug. 6, 2002

(54) METHOD AND APPARATUS FOR PROTECTING A SENSOR IN A DRILL COLLAR

(75) Inventors: Thomas Kruspe, Weinhausen; Volker Krueger, Celle, both of (DE); Robert A. Slade, Oxfordshire (GB)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/500,333

(22) Filed: Feb. 8, 2000

Related U.S. Application Data

(60) Provisional application No. 60/119,245, filed on Feb. 9, 1999.

(51) Int. Cl.[7] .................................................. G01V 3/00
(52) U.S. Cl. ...................................... 324/303; 324/300
(58) Field of Search .................................. 324/303, 300, 324/314, 306, 356, 369, 338

(56) References Cited

U.S. PATENT DOCUMENTS

| 3,293,542 A | 12/1966 | Piety ............................ 324/10 |
| 5,557,201 A | 9/1996 | Kleinberg et al. ........... 324/303 |
| 5,563,512 A | * 10/1996 | Mumby ......................... 175/50 |
| 5,629,623 A | * 5/1997 | Sezginer et al. ............. 324/303 |
| 5,705,927 A | 1/1998 | Sezginer et al. ............. 324/303 |
| 5,757,186 A | 5/1998 | Taicher et al. ............... 324/303 |
| 5,767,674 A | * 6/1998 | Griffin et al. ................ 324/303 |
| 5,816,344 A | 10/1998 | Turner ........................... 175/40 |
| 5,944,124 A | 8/1999 | Pomerleau et al. .......... 175/320 |
| 5,988,300 A | 11/1999 | Pomerleau et al. .......... 175/320 |
| 6,008,646 A | 12/1999 | Griffin et al. ................ 324/303 |

FOREIGN PATENT DOCUMENTS

| EP | 0505260 A2 | 9/1992 |
| EP | 0942147 A1 | 9/1999 |
| EP | 0981062 A2 | 2/2000 |
| WO | WO 97/21117 | 6/1997 |

* cited by examiner

*Primary Examiner*—Louis Arana
(74) *Attorney, Agent, or Firm*—Madan, Mossman & Sriram, P.C.

(57) ABSTRACT

A method and apparatus for protecting a sensor from impact and abrasion while drilling a borehole including a drill collar having a section of electrically non-conductive material, such as a composite material. The electrically non-conductive material has a rugged structural strength for conveying required drilling operation torque and load. The sensor which, for example, induces an RF field, is located inside the drill collar within the section of electrically non-conductive material wherein the sensor is protected from impact and abrasion while drilling a borehole without interference to the electromagnetic energy. The sensor is located, for example, within a load bearing section of the drill collar. Alternatively, the sensor is located inside a removable probe positioned inside the fluid channel through the drill collar. Stabilizers are used for stabilizing the probe within the channel. Preferably, metallic tool joints are connected to the section of electrically non-conductive material for coupling the drill collar to a drilling assembly. Hardfacing can also be embedded on an outer surface of the drill collar for providing additional abrasion protection.

42 Claims, 3 Drawing Sheets

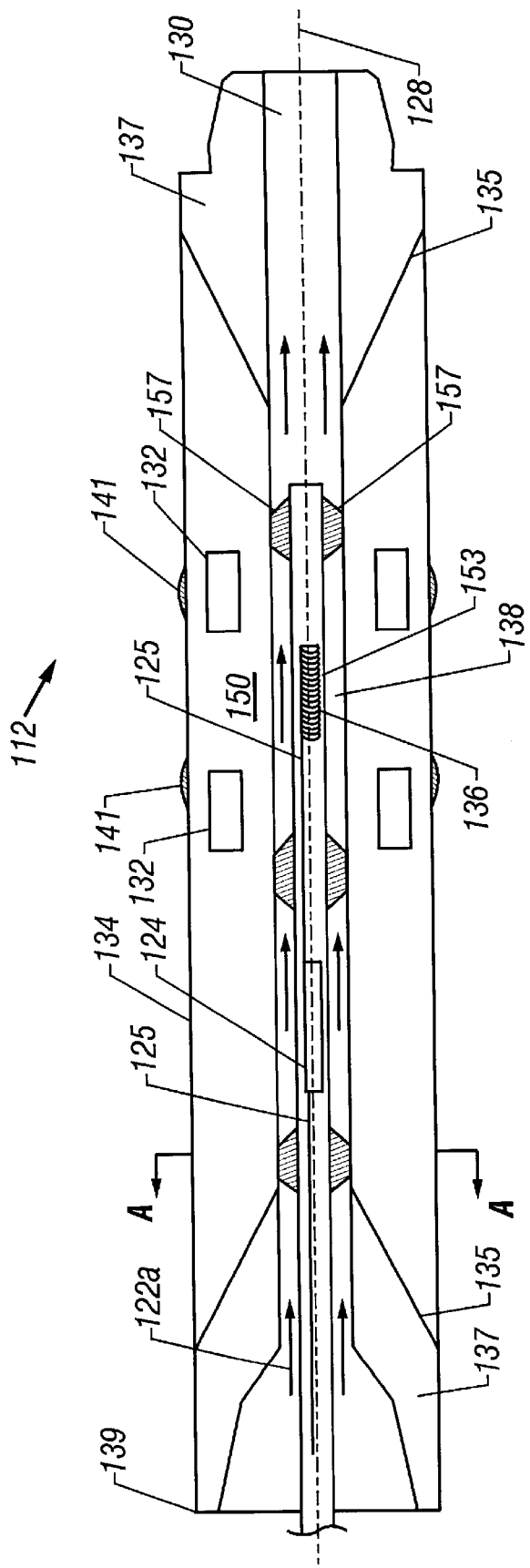
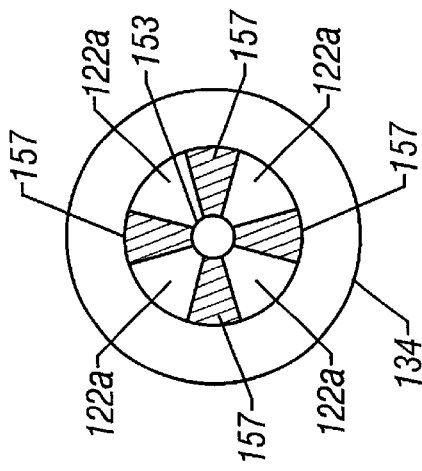
FIG. 3
FIG. 4

METHOD AND APPARATUS FOR PROTECTING A SENSOR IN A DRILL COLLAR

CROSS-REFERENCES TO RELATED APPLICATIONS

This applications claims priority from United States Provisional Patent Application Serial No. 60/119,245 filed on Feb. 9, 1999.

BACKGROUND OF THE INVENTION

1. Field of the Invention

This invention relates to a measurement-while-drilling nuclear magnetic resonance tool, and more particularly to a nuclear magnetic resonance tool having electromagnetic sensors inside a drill collar.

2. Description of the Related Art

To obtain hydrocarbons such as oil and gas, a drilling assembly (also referred to as the "bottom hole assembly" or the "BHA") carrying a drill bit at its bottom end is conveyed into the wellbore or borehole. The drilling assembly is usually conveyed into the wellbore by a coiled-tubing or a drill pipe. In the case of the coiled-tubing, the drill bit is rotated by a drilling motor or "mud motor" which provides rotational force when a drilling fluid is pumped from the surface into the coiled-tubing. In the case of the drill pipe, it is rotated by a power source (usually an electric motor) at the surface, which rotates the drill pipe and thus the drill bit.

Bottom hole assemblies ("BHA") generally include several formation evaluation sensors for determining various parameters of the formation surrounding the BHA during the drilling of the wellbore. Such sensors are usually referred to as the measurement-while-drilling ("MWD") sensors. Such sensors traditionally have electro-magnetic propagation sensors for measuring the resistivity, dielectric constant, water saturation of the formation, nuclear sensors for determining the porosity of the formation and acoustic sensors to determine the formation acoustic velocity and porosity. Other downhole sensors that have been used include sensors for determining the formation density and permeability. The bottom hole assemblies also include devices to determine the BHA inclination and azimuth, pressure sensors, temperature sensors, gamma ray devices, and devices that aid in orienting the drill bit in a particular direction and to change the drilling direction. Acoustic and resistivity devices have been proposed for determining bed boundaries around and in some cases in front of the drill bit. More recently, nuclear magnetic resonance ("NMR") sensors have gained extreme interest as MWD sensors as such sensors can provide direct measurement for water saturation porosity and indirect measurements for permeability and other formation parameters of interest.

NMR sensors utilize permanent magnets to generate a static magnetic field in the formation surrounding the MWD tool. A radio frequency (RF) coil disposed between the magnets or around the magnets induces an RF magnetic field. The magnets and the RF coils are positioned so that the static and RF fields are perpendicular to each other at least over a portion of the formation surrounding the NMR tool wherein the static field has a substantially uniform strength. This region is the region of interest or region of investigation. The NMR measurements corresponding to such region are needed to determine the formation parameters of interest.

MWD sensors are located inside or outside of a drill collar for performing measurements on the formation and its fluid content. A conventional drill collar is a metallic structure that conveys the torque required for the drilling operation. Also, the drill collar is a conduit for the drilling fluid or mud that is used to lubricate the drill bit and carry the cuttings to the surface. Since audio and radio frequency electromagnetic fields do not penetrate the metallic body of the drill collar, sensors of electromagnetic fields must be mounted outside the metallic body of the drill collar. These sensors are subject to abrasions resulting from particles in the drilling mud and the impact of the sensor against the earth formation. In some cases, shields or protective coatings are used on the drill collar to protect the sensors. Often, wear bands are employed on the drill collar to provide an adequate amount of standoff between the sensors and the formation thereby reducing or eliminating the impact of the sensor against the earth formation.

The present invention provides for a pulsed NMR tool housed in a drill collar wherein the sensors are located on the inside of the drill collar without interference to the audio and radio frequency electromagnetic fields by the collar thus protecting the sensors without the use of additional shields or wear bands.

SUMMARY OF THE INVENTION

The disadvantages of the prior art are overcome by the apparatus and method of the present invention which protects a sensor from impact and abrasion while drilling a borehole. The apparatus according to the present invention, for example, an NMR device, includes a drill collar having a section of electrically non-conductive material. The electrically non-conductive material has a rugged structural strength for conveying required drilling operation torque and load. A sensor which, for example, induces a radio frequency (RF) magnetic field, is located inside the drill collar within the section of electrically non-conductive material wherein the sensor is protected from impact and abrasion while drilling a borehole without interference to the RF field. Preferably, the electrically non-conductive material is a composite material.

The sensor is located, for example, within a load bearing section of the drill collar. Alternatively, the sensor is located inside a removable probe positioned inside a channel through a longitudinal axis of the drill collar. The channel allows a drilling fluid to flow through the drill collar. Stabilizers are used for stabilizing the probe within the channel.

Preferably, metallic tool joints are connected to the section of electrically non-conductive material for coupling the drill collar to a drilling assembly. Hardfacing can also be embedded on an outer surface of the drill collar for providing additional abrasion protection.

The NMR device further includes a magnet assembly for generating a static magnetic field in the earth formations traversed by the borehole. An electronic driving circuitry drives the sensor. The magnet assembly and the electronic driving circuitry are, preferably, located within the section of composite material of the drill collar, or, alternatively, can be located elsewhere within the drill collar.

BRIEF DESCRIPTION OF THE DRAWINGS

The present invention may be better understood, and its numerous objects, features, and advantages made apparent to those skilled in the art by referencing the accompanying drawings.

FIG. 3 is a cross section of an NMR tool and drill collar including a composite material in accordance with another embodiment of the present invention: and FIG. 4 is a cross-section of the NMR tool and drill collar of FIG. 3 along line A—A.

The use of the same reference symbols in different drawings indicates similar or identical items.

DESCRIPTION OF THE PREFERRED EMBODIMENTS

Figure 1:
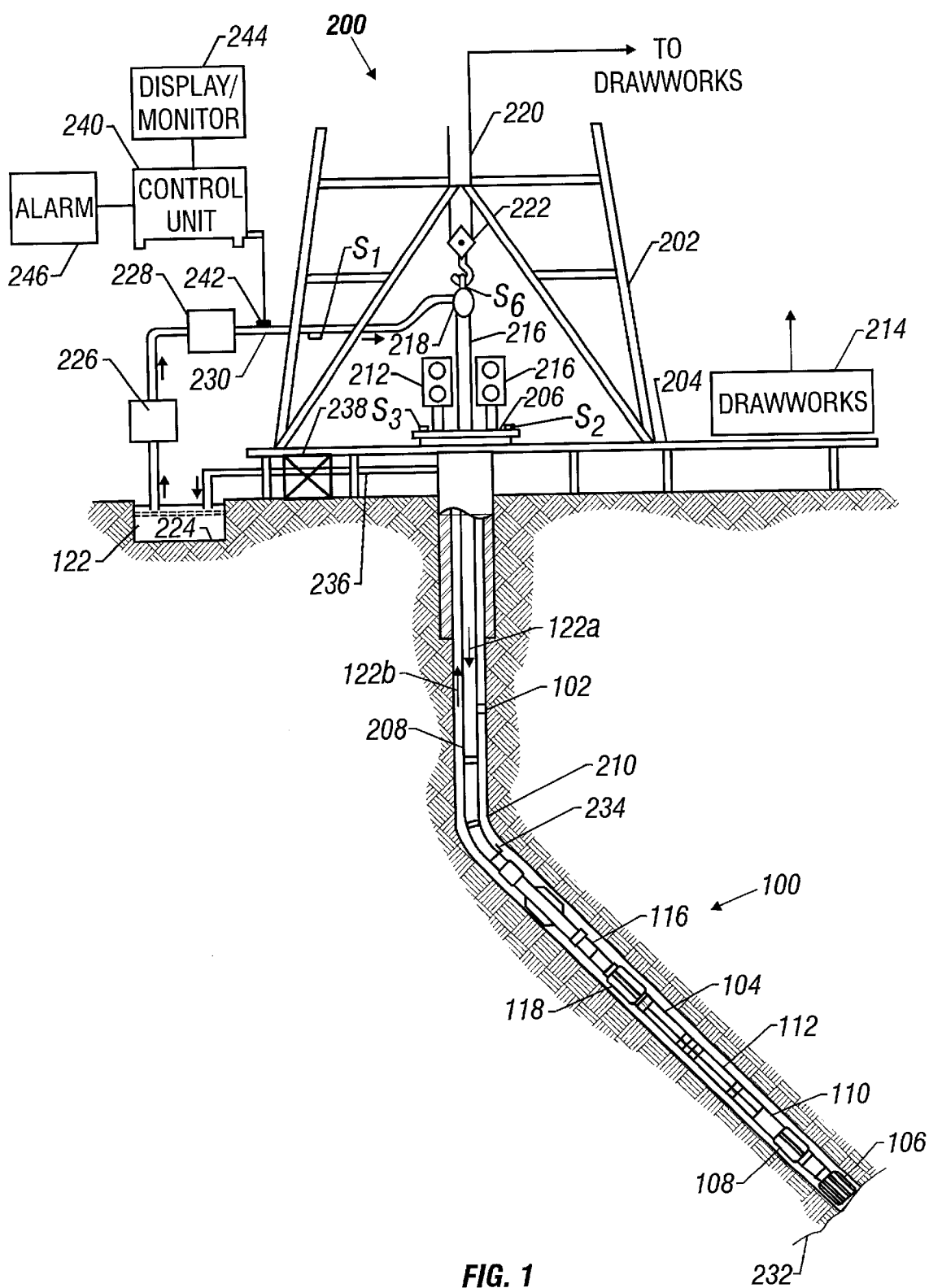
FIG. 1 illustrates a drilling system with an NMR tool in accordance with the present invention in a wellbore.

FIG. 1 shows a schematic diagram of a drilling system 200 with the drill string 102 carrying the drilling assembly 100 (also referred to as the bottom hole assembly "or BHA") conveyed in a "wellbore" or "borehole" 210. The drilling system 200 includes a conventional derrick 202 erected on a floor 204 which supports a rotary table 206 that is rotated by a prime mover such as an electric motor (not shown) at a desired rotational speed. The drill string 102 includes a tubing (drill pipe or coiled-tubing) 208 extending downward from the surface into the borehole 210. The drill string 102 is pushed into the wellbore 210 when a drill pipe is used as the conveying member 208. For coiled-tubing applications, a tubing injector, such as an injector 212, however, is used to move the tubing from a source thereof, such as a reel (not shown), to the wellbore 210. A drill bit 106, attached to the end of the drill BHA 100 is rotated to drill the wellbore 210. If a drill pipe is used, the drill string 102 is coupled to a drawworks 214 via a kelly joint 216, swivel 218 and line 220 through a pulley 222. Drawworks 214 is operated to control the weight on bit ("WOB"), which is an important parameter that affects the rate of penetration ("ROP"). The operations of the drawworks 214 and the tubing injector are known in the art and are thus not described in detail herein.

During drilling, a suitable drilling fluid 122 (commonly referred to as the "mud") from a mud pit (source) 224 is pumped into the tubing 208 by a mud pump 226. The drilling fluid 122 passes from the mud pump 224 into the drill string 102 (as shown by arrow 122a) via a desurger 228 and the fluid line 230. The drilling fluid 122 discharges at the borehole bottom 232 through openings (not shown) in the drill bit 106. The drilling fluid 122 returns to the mud pit 224 at the surface via the annulus 234 between the drill string 102 and the borehole 210 (as shown by arrow 122b) and a return line 236. The drilling fluid acts to lubricate the drill bit 106 and to carry borehole cutting or chips away from the drill bit 106. A drill cutting screen 238 removes the drill cuttings from the returning drilling fluid 122b. A sensor $S_1$ in line 230 provides information about the fluid flow rate. A surface torque sensor $S_2$ and a sensor $S_3$ associated with the drill string 102 respectively provide information about the torque and the rotational speed of the drill string 102. Tubing injection speed is determined from the sensor $S_5$, while the sensor $S_6$ provides the hook load of the drill string 102.

A surface control unit or processor 240 receives signals from the downhole sensors and devices via a sensor 242 placed in the fluid line 230 and signals from sensors $S_1$–$S_6$ and other sensors used in the system 200 and processes such signals according to programmed instructions provided to the surface control unit 240. The surface control unit 240 displays desired drilling parameters and other information on a display/monitor 244 that is utilized by an operator to control the drilling operations. The surface control unit 240 preferably includes a computer or a microprocessor-based processing system, memory for storing programs or models and data, recorder for recording data and other peripherals. The control unit 240 is preferably adapted to activate alarms 246 when certain unsafe or undesirable operating conditions occur.

In some applications the drill bit 106 is rotated by only rotating the drill pipe 208. However, in many other applications, the downhole motor 110 (mud motor) is disposed in the drilling assembly 100 to rotate the drill bit 106 and the drill pipe 208 is rotated usually to supplement the rotational power, if required, and to effect changes in the drilling direction. The mud motor 110 is coupled to the drill bit 106 via a drive shaft (not shown) disposed in a bearing assembly 108. The mud motor 110 rotates the drill bit 106 when the drilling fluid 122 passes through the mud motor 110 under pressure. The bearing assembly 108 supports the radial and axial forces of the drill bit 106, the downthrust of the mud motor 110 and the reactive upward loading from the applied weight on bit.

The communication sub 116, power unit 118, MWD tool 104, and NMR tool 112 are all connected in tandem with the drill string 102. The drilling assembly 100 makes various measurements including the pulsed nuclear magnetic resonance measurements while the borehole is being drilled. The communication sub 116 obtains the signals and measurements and transfers the signals, using two-way telemetry, for example, to be processed on the surface. Alternatively, the signals can be processed using a downhole processor in the drilling assembly 100.

In FIG. 1, a drilling assembly 100 at the end of the drill string 102 is also illustrated. For example, a measurement-while-drilling (MWD) tool 104, an associated pulsed nuclear magnetic resonance (NMR) tool 112, and a pulsed power unit 118 are connected in tandem in the drilling assembly 100. The MWD tool 104 may also include a sonic sensor, a density measurement tool, and a porosity measurement tool. A communication sub 116 using, for example, two-way telemetry, is also provided as illustrated in the drilling assembly 100. The drilling assembly 100 also includes a drill bit 106, bearing assembly 108, and downhole mud motor 110. A channel (not shown in this figure) within the drill string 102 and drilling assembly 100 allows the drilling fluid 122 through the drill string 102 and drilling assembly 100.

The communication sub 116, power unit 118, MWD tool 104, and NMR tool 112 are all connected in tandem with the drill string 102. Such subs and tools form the bottom hole assembly or drilling assembly 100 between the drill string 102 and the drill bit 106. Typically, stabilizers (not shown) are used to stabilize and center the drilling assembly 100 and tools within the borehole. The drilling assembly 100 makes various measurements including pulsed nuclear magnetic resonance measurements while the borehole is being drilled for investigating characteristics of the earth formations traversed by the borehole 210.

Figure 2:
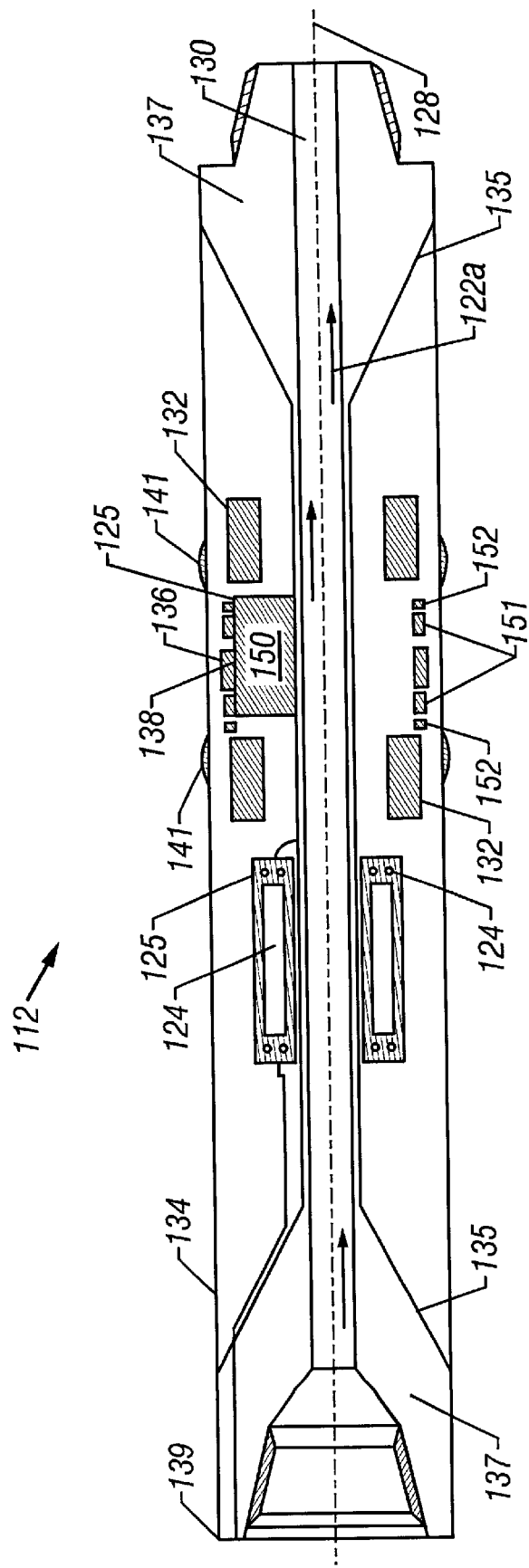
FIG. 2 is a cross-section of an NMR tool and drill collar including a composite material in accordance with one embodiment of the present invention.

Referring to FIG. 2, an embodiment of the apparatus for protecting a sensor from impact and abrasions while drilling a borehole according to the present invention is illustrated. The pulsed NMR tool 112 is housed in a drill collar 134 including a section of electrically non-conductive material 150 having a rugged structural strength for conveying required drilling operations torque and load.

In prior art NMR tools and downhole apparatus using electromagnetic sensors, a sensor assembly, including, for example, one or more transmitting/receiving RF coils or antenna, are typically mounted outside the metallic body of the drill collar since RF electromagnetic fields do not penetrate the metallic body of the drill collar. In the method and apparatus of the present invention, the NMR tool 112 is housed in a drill collar 134 including a material that does not interfere with the radio frequency electromagnetic fields, such as the section of electrically non-conductive material 150, and allows for locating the sensor assembly inside the drill collar. The electrically non-conductive material 150 is, preferably, a composite material. The composite material is a structural material comprised of two or more different materials such as, for example, a carbon fiber reinforced epoxy resin or a fiberglass based material, and has a rugged structural strength for carrying the load and conveying the torque required for the drilling operation.

In the method and apparatus of the present invention, as illustrated in FIGS. 2 and 3, a sensor assembly 138 including an RF coil 136 is positioned inside the drill collar 134 within the section of electrically non-conductive material 150 wherein RF fields can penetrate the electrically non-conductive material 150 of the drill collar 134 and wherein the sensor assembly 138 is protected from abrasions resulting from particles in the drilling mud and the impact of the sensor against the earth formation.

Preferably, the NMR tool 112 includes a magnet assembly 132 for generating a static magnetic field having a region of substantially uniform field strength. In the embodiment illustrated in FIG. 2, the magnet assembly 132 includes tubular magnets arranged coaxially within the NMR tool 112 to surround a channel 130. The channel 130 allows the drilling fluid to flow through the NMR tool 112 (as shown by arrow 122a). The magnet assembly 132 is permanently magnetized in the axial direction and have poles positioned in opposing directions. Like magnetic poles, for example, the north magnetic poles of the magnets face one another. The axially aligned magnet assembly 132 having like poles facing each other creates a toroidal region of homogeneous radial static magnetic field centered on the longitudinal axis 128 of the NMR tool 112. The distance of the region of homogeneous radial magnetic field from the axis of the magnet assembly 132 is dependent upon the strength of the magnet assembly 132 and the distance between like poles of the magnet assembly 132. Alternatively, the magnets have poles positioned in the same direction wherein opposing magnetic poles face each other. The axially aligned magnet assembly 132 having opposing poles facing each other creates a longitudinal region of homogeneous static magnetic field.

The sensor assembly 138 including the RF coil 136 is located between the magnet assembly 132. The RF coil 136 is coupled, for example, through wire connections 125, to a suitable RF pulse transmitter such as the pulsed power unit 118 (shown in FIG. 1) for providing power at selected frequencies, and to electronic driving circuitry 124 for driving the RF transmitting antenna or RF coil 136. The RF coil 136 is pulsed and creates a high frequency electromagnetic RF field orthogonal to the static magnetic field generated by the magnet assembly 132 and in the region of substantially uniform field strength creating a region or volume of interest for NMR signal sensitivity. The sensor assembly 138 detects the NMR signals resulting therefrom. Alternatively, in the embodiment illustrated in FIG. 2, shimming coils 151 and compensating capacitors 152 are also connected to the RF coil 136 for tuning and focussing the RF field. Rock pores in the earth formations surrounding the wellbore are filled with fluid, typically water or hydrocarbon. The hydrogen nuclei in the fluid are aligned by the region of homogeneous magnetic field, generated by the magnet assembly 132. The hydrogen nuclei are then "flipped" away from the homogeneous magnetic field by the pulsed RF field produced by RF coil 136. At the termination of the pulsed RF field from RF coil 136, the hydrogen nuclei revolve or precess at high frequency around the homogeneous magnetic field inducing an NMR signal in the RF coil 136 until the hydrogen nuclei relax to the original direction along the homogeneous magnetic field 140. The induced NMR signals are processed downhole or sent to the surface for processing.

The drill collar 134 preferably includes metallic tool joints 137 for coupling the NMR tool 112 to the drilling assembly including, for example, the MWD tool at connection 139. The electrically non-conductive material 150 is joined at interfaces 135 to the metallic tool joints 137. The metal to composite interfaces 135 are accomplished using techniques apparent to those skilled in the art such as, for example, a fine taper on the metal glued to the composite, or a lock mechanism. In the NMR tool 112 illustrated in the FIG. 2, the magnet assembly 132, the electronic circuitry 124, the shimming coils 151, and the compensating capacitors 152 are illustrated as located within the electrically non-conductive material 150. However, in an alternative embodiment, the magnet assembly 132, the electronic circuitry 124, the shimming coils 151, and the compensating capacitors 152 are located within a metallic section of the drill collar 134. In an alternative embodiment, the entire drill collar 134 is comprised of the electrically non-conductive material 150.

Selectively embedded hardfacing 141 is, preferably, located on the outside of the drill collar 134 to provide additional mechanical strength and added protection from abrasion of the drill collar 134 by the drilling fluid. The selectively placed hardfacing 141 includes, for example, a tungsten carbide material or ceramic material.

The apparatus of the present invention is not limited to the illustrated magnet arrangement. For example, the magnet assembly 132 can include a plurality of stacked and spaced apart tubular permanent magnets aligned with the longitudinal axis 128 of the NMR tool 112. The stacked and spaced apart tubular magnets can be arranged in pairs on opposite sides of a symmetry plane (see the magnet assembly 132 shown in FIG. 2) with magnetic poles of each pair of magnets in opposition. A cylinder of ferrite (a ferrite yoke) may be placed between the tubular magnets for concentrating the magnetic flux. The static magnetic field produced by the magnet/yoke arrangement also creates a toroidal radial magnetic field centered on the longitudinal axis 128 of the NMR tool 112. Alternatively, a single magnet can be used, the magnet basically comprising a sleeve having a uniform magnetization axis which is perpendicular to the longitudinal axis 128 of the NMR tool 112 as described in U.S. Pat. No. 5,280,243 (Miller), for providing the toroidal radial static magnetic field. Alternatively, the magnet assembly includes at least three magnets wherein at least two magnets are positioned having like poles facing the formation and at least one centered magnet having a reversed pole positioning for creating a generally radial RF magnetic field. It will also be clearly apparent to those skilled in the art that the identical homogeneous radial magnetic field area can also be obtained if the magnet assembly 132 includes dc energized electromagnets, or superconducting dc electromagnets.

The apparatus of the present invention is also not limited to the illustrated sensor assembly and RF coil arrangement. Any number of appropriate antenna or coil arrangements which provide an RF field perpendicular to the toroidal radial magnetic field to create the region of interest for NMR signal sensitivity can be used and located inside the composite material 150 of the drill collar 134 without interference to the RF electromagnetic fields according to the present invention. For example, the NMR tool can employ separate transmitter and receiver coils located inside the composite material 150 of the drill collar 134.

FIG. 3 illustrates another embodiment of the apparatus of the present invention wherein the sensor assembly of the NMR tool is located inside the drill collar within a removable tube or probe. The magnet assembly 132 includes, for example, at least two tubular magnets arranged coaxially within the NMR tool 112 to surround the channel 130. The channel 130 allows the drilling fluid to flow through the NMR tool 112 (as shown by arrow 122*a*). The magnet assembly 132 is permanently magnetized in the axial direction and have poles positioned in opposing directions. Like magnetic poles, for example, the north magnetic poles of the magnets face one another. The axially aligned magnet assembly 132 having like poles facing each other creates a toroidal region of homogeneous radial static magnetic field centered on the longitudinal axis 128 of the NMR tool 112. The distance of the region of homogeneous radial magnetic field from the axis of the magnet assembly 132 is dependent upon the strength of the magnet assembly 132 and the distance between like poles of the magnet assembly 132. Alternatively, the magnets have poles positioned in the same direction wherein opposing magnetic poles face each other. The axially aligned magnet assembly 132 having opposing poles facing each other creates a longitudinal region of homogeneous static magnetic field. In an alternate embodiment of the invention (not shown), the magnet assembly 132 includes superconducting magnets. This makes it possible to generate strong magnetic fields at an increased distance from the borehole inside the formation and thus improve the signal-to-noise ratio in NMR measurements obtained by the device.

The sensor assembly 138 is positioned, for example, between the pair of tubular magnets and located within a removable probe 153 comprised of a material that does not interfere with the RF electromagnetic fields, such as a non-conductive composite material or a ferrite. The probe 153 is positioned along the longitudinal axis 128 of the NMR tool 112 and is centered and stabilized within the channel 130 using one or more stabilizers 157. Both the probe 153 and the one or more stabilizers 157 are removable from the drill collar 134. The sensor assembly 138 including the RF coil 136 and the probe 153 are within a gap in the fluid path 122*a* and the sensor assembly 138 is protected from contact with the drilling fluid by the probe 153. FIG. 4 is a cross section of the NMR tool and drill collar of FIG. 3 along line A—A further illustrating the stabilizers 157 used for stabilizing the probe 153 while still providing a fluid path 122*a* for the drilling fluid.

The sensor assembly 138 is positioned inside the composite material 150 of the drill collar 134 and the probe 153 wherein RF fields can penetrate the electrically non-conductive material 150 of the drill collar 134 and the probe 153. The RF coil 136 is thus protected from abrasions resulting from particles in the drilling fluid outside the drill collar 134 and impact of the sensor against the earth formation. The probe 153 is subjected to abrasion and corrosion only from the downgoing drilling fluid which does not contain the borehole cuttings and is therefore less abrasive than the returning drilling fluid which does contain the borehole cuttings. Since the probe 153 is not subject to the same high abrasion as the drill collar 134 and is not a load bearing member of the drill collar 134, the material for the probe 153 need not be the same rugged structural material as the section of electrically non-conductive material 150 in the load bearing drill collar 134. In an alternate embodiment of the invention, the RF coil 136 is on the outside (not shown) of the probe 153.

The sensor assembly 138 and the electronic driving circuitry 124 are self-contained in the probe 153. The RF coil 136 is coupled, for example, through wire connections 125, to the electronic driving circuitry 124 for driving the RF coil 136 and to a suitable RF pulse transmitter such as the pulsed power unit 118 shown in FIG. 1 for providing power at selected frequencies. The wire connections 125, for example, are contained within the probe 153 such that no connection to the drill collar 134 is necessary.

The electrically non-conductive material 150 is, preferably, joined at interfaces 135 to the metallic tool joints 137 as described in FIG. 2. The metallic tool joints 137 couple the NMR tool 112 to the drilling assembly including the MWD tool at connection 139. In an alternative embodiment, the entire drill collar 134 is comprised of the electrically non-conductive material 150. In the NMR tool 112 illustrated in the FIG. 3, the magnet assembly 132 is illustrated as located within the electrically non-conductive material 150. However, in an alternative embodiment, the magnet assembly 132 is located within a metallic section of the drill collar 134. The RF coil 136 is pulsed and creates a high frequency RF field creating a region or volume of interest for NMR signal sensitivity as described in FIG. 2 for inducing NMR signals which are then processed.

Selectively embedded hardfacing 141 is, preferably, located on the outside of the drill collar 134 to provide additional mechanical strength for axial and bearing loads induced in the drill collar 134 during drilling and added protection from impact with the earth formations.

The apparatus of the present invention as shown in FIG. 3 is not limited to the illustrated magnet assembly and arrangement. For example, as described previously, a plurality of stacked and spaced apart tubular permanent magnets can be used as well as dc energized electromagnets, or superconducting dc electromagnets. The apparatus of the present invention is also not limited to the illustrated RF coil arrangement. Any number of appropriate antenna or coil arrangements which provide an RF field orthogonal to the generated static magnetic field to create the region of interest for NMR signal sensitivity can be used and located inside the probe 153 and within the section of electrically non-conductive material 150 of the drill collar 134 without interference to the RF fields according to the present invention. For example, the NMR tool can employ separate transmitter and receiver coils or antenna located inside the probe 153 and within the electrically non-conductive material 150 of the drill collar 134.

The present invention therefore provides for a pulsed NMR tool housed in a drill collar wherein the sensor assembly is located inside of the drill collar without interference to the audio and radio frequency electromagnetic fields thus protecting the sensor assembly without the use of additional shields or wear bands.

While preferred embodiments have been shown and described, various modifications and substitutions may be made thereto without departing from the spirit and scope of the invention. Accordingly it is to be understood that the present invention has been described by way of illustrations and not limitations.

What is claimed is:

1. An apparatus for protecting a sensor from impact and abrasion while drilling a borehole comprising:

a drill collar including a load bearing section of electrically non-conductive material wherein the electrically non-conducting material has a rugged structural strength for conveying required drilling operation torque and load; and a sensor located inside the drill collar within said load bearing section wherein at least a portion of said sensor is integrated into said load bearing section.

2. An apparatus, as recited in claim 1, wherein the electrically non-conductive material is a composite material.

3. An apparatus, as recited in claim 1, wherein the sensor includes at least one of (i) a transmitter for transmitting radio frequency electromagnetic signals, and, (ii) a receiver for receiving radio frequency electromagnetic signals.

4. An apparatus, as recited in claim 1, further comprising:

a probe including at least a portion of the sensor, said probe positioned inside the channel.

5. An apparatus, as recited in claim 4, wherein the probe is comprised of a non-conductive material.

6. The apparatus as defined in claim 4 wherein said probe is a removable probe.

7. The apparatus as defined in claim 6 further comprising at least one stabilizer for stabilizing the probe within the channel.

8. The apparatus as defined in claim 6 wherein the portion of the sensor included in the probe comprises an RF coil.

9. An apparatus, as recited in claim 1, wherein the drill collar further comprises: metallic tool joints connected to the section of composite material for coupling the drill collar to a drilling assembly.

10. An apparatus, as recited in claim 1, wherein the drill collar further comprises:

hardfacing embedded on an outer surface of the drill collar for providing additional abrasion protection.

11. A nuclear magnetic resonance (NMR) device for use in a drilling assembly while drilling a borehole for investigating a characteristic of earth formations traversed by the borehole comprising:

a drill collar including a load bearing section of electrically non-conductive material wherein the electrically non-conductive material has a rugged structural strength for conveying required drilling operation torque and load;

a NMR sensor assembly within said load bearing section for obtaining information about NMR properties of said formations.

12. An NMR device, as recited in claim 11, wherein the electrically non-conductive material is a composite material.

13. An NMR device, as recited in claim 12, wherein the drill collar further comprises:

metallic tool joints connected to the section of electrically non-conductive material for coupling the drill collar to a drilling assembly.

14. An NMR device, as recited in claim 12, wherein the drill collar further comprises:

hardfacing embedded on an outer surface of the drill collar for providing additional abrasion protection.

15. An NMR device, as recited in claim 11, further comprising:

electronic driving circuitry for driving said sensor assembly.

16. An NMR device, as recited in claim 11, further comprising:

a channel through a longitudinal axis of the drill collar for allowing a drilling fluid to flow through the drill collar; and a probe carrying at least a portion of the NMR sensor assembly positioned inside the channel.

17. The NMR device as recited in claim 16 wherein said probe is a removable probe.

18. The NMR device as recited in claim 17 the further comprising at least one stabilizer for stabilizing the probe within the channel.

19. An NMR device, as recited in claim 16, wherein the probe is comprised of a non-conductive material.

20. An NMR device, as recited in claim 19, wherein the NMR sensor assembly further comprises a magnet assembly located within said load bearing section.

21. An NMR device, as recited in claim 11, wherein the NMR sensor assembly further comprises a magnet assembly including at least one superconducting magnet.

22. A method for protecting a sensor from impact and abrasion while drilling a borehole within an earth formation, said sensor providing information about said earth formation, the method comprising:

providing a load bearing section of electrically non-conductive material in a drill collar wherein the electrically non-conductive material has a rugged structural strength for conveying required drilling operation torque and load; and locating a sensor inside the drill collar within said load bearing section.

23. A method, as recited in claim 20, wherein the electrically non-conductive material is a composite material.

24. A method, as recited in claim 22, further comprising:

flowing a drilling fluid through a channel in a longitudinal axis of the drill collar; and positioning a probe including at least a portion of the sensor within the channel.

25. A method, as recited in claim 24, wherein the probe is comprised of a non-conductive material.

26. A method, as recited in claim 24 wherein the probe is a removable probe.

27. A method, as recited in claim 26 further comprising using at least one stabilizer on the probe for stabilizing the probe within the channel.

28. A method, as recited in claim 20, further comprising:

connecting metallic tool joints to the section of electrically non-conductive material for coupling the drill collar to a drilling assembly.

29. A method, as recited in claim 22, further comprising:

embedding hardfacing on an outer surface of the drill collar for providing additional abrasion protection.

30. A method for investigating a characteristic of earth formations traversed by the borehole using a nuclear magnetic resonance (NMR) device in a drilling assembly while drilling a borehole comprising:

providing a load bearing section of electrically non-conductive material in a drill collar wherein the electrically non-conductive material has a rugged structural strength for conveying required drilling operation torque and load;

generating a static magnetic field having a region of substantially uniform field strength in the formations; and inducing a radio frequency (RF) field in said region of substantially uniform field strength and detecting NMR signals resulting therefrom using a sensor assembly located inside the section of electrically non-conductive material in the drill collar.

31. A method, as recited in claim 30, wherein the electrically non-conductive material is a composite material.

32. A method, as recited in claim 30, further comprising:
driving said sensor assembly using an electronic driving circuitry.

33. A method, as recited in claim 30, wherein the static magnetic field is generated using a magnet assembly integrated into said load bearing section.

34. A method, as recited in claim 30, further comprising:
flowing a drilling fluid through a channel in a longitudinal axis of the drill collar; and
positioning an electrically non-conductive probe including at least a portion of the sensor assembly inside the channel.

35. A method, as recited in claim 34, wherein the probe is comprised of a non-conductive material.

36. A method, as recited in claim 34, wherein the electronic driving circuitry is located inside the probe.

37. A method, as recited in claim 34, wherein the static magnetic field is generated using a magnet assembly including a superconducting magnet located within the probe.

38. A method, as recited in claim 34, wherein the probe is a removable probe.

39. A method, as recited in claim 38 further comprising using at least one stabilizer on the probe for stabilizing the probe within the channel.

40. A method, as recited in claim 30, further comprising:
driving said sensor assembly using an electronic driving circuitry.

41. A method, as recited in claim 30, further comprising:
connecting metallic tool joints to the section of electrically non-conductive material for coupling the drill collar to a drilling assembly.

42. A method, as recited in claim 30, further comprising:
embedding hardfacing on an outer surface of the drill collar for providing additional abrasion protection.

* * * * *